(12) United States Patent
Newell et al.

(10) Patent No.: US 11,679,999 B2
(45) Date of Patent: *Jun. 20, 2023

(54) METHOD AND APPARATUS TO SEPARATE PER- AND POLYFLUOROALKYL SUBSTANCES (PFAS) FROM WATER USING COLLOIDAL GAS APHRONS (CGAS)

(71) Applicant: GSI Environmental Inc., Houston, TX (US)

(72) Inventors: Charles J. Newell, Houston, TX (US); Poonam R. Kulkarni, Houston, TX (US); Hassan Javed, Houston, TX (US); Nicholas W. Johnson, Houston, TX (US); Stephen D. Richardson, Houston, TX (US)

(73) Assignee: GSI Environmental Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/045,493

(22) Filed: Oct. 11, 2022

(65) Prior Publication Data

US 2023/0110561 A1 Apr. 13, 2023

Related U.S. Application Data

(63) Continuation of application No. 17/721,529, filed on Apr. 15, 2022.

(Continued)

(51) Int. Cl.
*C02F 1/58* (2023.01)
*C02F 1/24* (2023.01)

(Continued)

(52) U.S. Cl.
CPC ............... *C02F 1/583* (2013.01); *C02F 1/24* (2013.01); *C02F 1/285* (2013.01);

(Continued)

(58) Field of Classification Search
None
See application file for complete search history.

(56) References Cited

PUBLICATIONS

Ali Hashim et al. (J Chem Technol Biotechnol, 2012, pp. 1-21). (Year: 2012).*

(Continued)

*Primary Examiner* — Clare M Perrin
(74) *Attorney, Agent, or Firm* — James D. Petruzzi; The Petruzzi Law Firm

(57) ABSTRACT

A method for the decontamination of water containing one or more PFAS, having the steps of generating colloidal gas aphrons (CGAs) by mixing a gas, water, and one or more surfactants together with high shear forces, introducing the CGAs and a PFAS-containing water in an enclosed space where the CGAs move upwards through the water due to their inherent buoyancy, allowing the plurality of CGAs to extract PFAS from the water, and separating the PFAS-containing CGAs from the surface of the water in the enclosed space for further treatment or disposal, leaving the water with lower PFAS concentrations in the vessel. The aphrons may be anionic or cationic and created by mixing speeds or surfactant concentration, and treatment may be with gas bubbles to remove PFAS from water gas bubbles or destruction of PFAS by plasma reactor or deployed in situ through wells into geologic ground formations.

29 Claims, 13 Drawing Sheets

Related U.S. Application Data

(60) Provisional application No. 63/237,595, filed on Aug. 27, 2021.

(51) Int. Cl.
  *C02F 1/28* (2023.01)
  *C02F 1/00* (2023.01)
  *C02F 101/36* (2006.01)
  *C02F 103/06* (2006.01)

(52) U.S. Cl.
  CPC .... *C02F 2001/007* (2013.01); *C02F 2101/36* (2013.01); *C02F 2103/06* (2013.01); *C02F 2201/002* (2013.01); *C02F 2305/04* (2013.01)

(56) References Cited

PUBLICATIONS

Spinelli et al. (Colloids and Surfaces A: Physicochem. Eng. Aspects, 2010, 353, 57-63). (Year: 2010).*
Burns et al. (Remediation, 2021, 31, 19-33). (Year: 2021).*
Xiao et al. (Environ. Sci. Technol., 2017, 51, 6342-6351). (Year: 2017).*
McCleaf et al. (AWWA Water Science, 2021, pp. 1-14). (Year: 2021).*
Tao et al. (Journal of Contaminant Hydrology, 2020, 103620). (Year: 2020).*
Aysan Molaei, Kristian E. Waters, Copper ion removal from dilute solutions using colloidal liquid aphrons, Separation and Purification Technology, 2015 vol. 152, 115-122, https://doi.org/10.1016/j.seppur.2015.08.001, US.
Crownover, E., Oberle, D., Kluger, M., Heron, G., 2019. Perfluoroalkyl and polyfluoroalkyl substances thermal desorption evaluation. Remediation, 2019, 29(4), 77-81, US. https://doi.org/10.1002/rem.21623.
Gagliano, E., Sgroi, M., Falciglia, P.P., Vagliasindi, F.G.A., Roccaro, P., 2020. Removal of poly- and perfluoroalkyl substances (PFAS) from water by adsorption: Role of PFAS chain length, effect of organic matter and challenges in adsorbent regeneration. Water Research, 151, 115381, GB. https://doi.org/10.1016/j.watres.2019.115381.
Hiblow, What Type of Diffuser Should I Buy for My Pond, Hiblow USA, May 28, 2021, https://www.hiblow-usa.com/2021/05/03/pond-aeration-system-diffuser-options/, 2021, US.
Houtz, E.F. and Sedlak, D.L., Oxidative Conversion as a Means of Detecting Precursors to Perfluoroalkyl Acids in Urban Runoff. Environmental Science and Technology, 2012, 46(17), 9342-9349, US. https://doi.org/10.1021/es302274g.
Huang, S. and Jaffe, P.R., Defluorination of Perfluorooctanoic Acid (PFOA) and Perfluorooctane Sulfonate (PFOS) by *Acidimicrobium* sp. Strain A6. Environmental Science and Technology, 2019, 53(19), 11410-11419, US. https://doi.org/10.1021/acs.est.9b04047.
Longe, T A., Colloidal gas asphrons: Generation, flow characterization and application in soil and groundwater decontamination, Virginia Polytechnic Inst. and State Univ. 1989, US.
Wei Tao, Changgen Mei, Nurhidayah Hamzah, The application of surfactant colloidal gas aphrons to remediate contaminated soil: A review, Journal of Contaminant Hydrology, 2020, vol. 231, 103620, https://doi.org/10.1016/j.jconhyd.2020.103620, NL.
McKenzie, E.R., Siegrist, R.L., McCray, J.E., Higgins, C.P., Effects of Chemical Oxidants on Perfluoroalkyl Acid Transport in One-Dimensional Porous Media Columns. Environmental Science and Technology, 2015, 49(3), 1681-1689, https://doi.org/10.1021/es503676p, US.
McKenzie, E.R., Siegrist, R.L., McCray, J.E., Higgins, C.P., The influence of a non-aqueous phase liquid (NAPL) and chemical oxidant application on perfluoroalkyl acid (PFAA) fate and transport. Water Research, 92, 199-207, 2016, https://doi.org/10.1016/j.watres.2016.01.025, GB.
Pasdar, M., Kazemzadeh, E., Kamari, E. et al., Insight into selection of appropriate formulation for colloidal gas aphron (CGA)-based drilling fluids, Petroleum Science. 2020, 17, 759-767, https://doi.org/10.1007/s12182-020-00435-z, CN.
Sorengard, M., Ostblom, E., Kohler, S., Ahrens, L., Adsorption behavior of per- and polyfluoralkyl substances (PFASs) to 44 inorganic and organic sorbents and use of dyes as proxies for PFAS sorption. Journal of Environmental Chemical Engineering 8, 2020, GB. 103744. https://doi.org/10.1016/j.jece.2020.103744.
Franklin, Tom, Fine vs. Coarse Bubblers, SSI Aeration, Inc., Jul. 19, 2019, https://www.ssiaeration.com/fine-vs-coarse-bubble-diffusers/, US.
USEPA, Interim recommendations to address groundwater contaminated with perfluorooctanoic acid and perfluorosulfonate. United States Environmental Protection Agency, 2019, https://www.epa.gov/pfas/interim-recommendations-addressing-groundwater-contaminated-pfoa-and-pfos, US.
S. Basu & P. R. Malpani, Removal of Methyl Orange and Methylene Blue Dye From Water Using Colloidal Gas Aphron—Effect ff Processes Parameters, 2001, Separation Science and Technology, 36:13, 2997-3013, https://doi.org/10.1081/SS-100107642, US.
Burns, D. J., Stevenson, P., & Murphy, P. J. C., PFAS removal from groundwaters using Surface-Active Foam Fractionation, 2021, Remediation, 31, 19-33, https://doi.org/10.1002/rem.21694, US.
E. Fuda, P. Jauregi, An insight into the mechanism of protein separation by colloidal gas aphrons (CGA) generated from ionic surfactants, Journal of Chromatography B, 2006, vol. 843, Issue 2, 317-326, https://doi.org/10.1016/j.ichromb.2006.06.032, GB.
Hashim, M.A., Mukhopadhyay, S., Gupta, B.S. and Sahu, J.N., Application of colloidal gas aphrons for pollution remediation. J. Chem. Technol. Biotechnol., 2012, 87: 305-324, https://doi.org/10.1002/jctb.3691, GB.
McCleaf, P., Kjellgren, Y., & Ahrens, L., Foam fractionation removal of multiple per- and polyfluoroalkyl substances from landfill leachate. AWWA Water Science, 2021, e1238. https://doi.org/10.1002/aws2.1238, US.
J. Merz, G. Schembecker, Stephanie Riemer, M. Nimtz, H. Zorn, Purification and identification of a novel cutinase from Coprinopsis cinerea by adsorptive bubble separation, Separation and Purification Technology, 2009, vol. 69, Issue 1, 57-62,, https://doi.org/10.1016/j.seppur.2009.06.021, US.
J. Merz, B. Burghoff, H. Zorn, G. Schembecker, Continuous foam fractionation: Performance as a function of operating variables, Separation and Purification Technology, 2011, vol. 82, pp. 10-18, https://doi.org/10.1016/j.seppur.2011.07.023, US.

* cited by examiner

METHOD AND APPARATUS TO SEPARATE PER- AND POLYFLUOROALKYL SUBSTANCES (PFAS) FROM WATER USING COLLOIDAL GAS APHRONS (CGAS)

CROSS-REFERENCE TO RELATED APPLICATIONS

This application claims the benefit of priority under 35 U.S.C. 120 and is a continuation of U.S. Utility application Ser. No. 17/721,529, entitled "Method and Apparatus to Separate Per- and Polyfluoroalkyl Substances (PFAS) from Water Using Colloidal Gas Aphrons (CGAs)" filed Apr. 15, 2022, which is hereby incorporated as if fully set forth herein, which claims benefit of priority of U.S. Provisional Patent Application Ser. No. 62/237,595 filed on Aug. 27, 2021 entitled "Process to Separate Per- and Polyfluoroalkyl Substances (PFAS) from Water using Colloidal Gas Aphrons (CGAs)" which is incorporated herein by reference.

BACKGROUND OF THE INVENTION

Per- and polyfluoroalkyl substances (PFAS) are a class of highly stable fluorinated chemicals that have seen broad use in consumer and commercial goods over the past 70 years. Due to their unique properties that include thermal stability, abilities to form aqueous films (foams), and hydro- and oleophobicity, PFAS have seen a wide range of uses including firefighting foams, water and oil repellant coatings, and non-stick coatings for cookware among many other applications.

Within the past two decades, scientists have started recognizing that PFAS have the potential to negatively impact human and environmental health through a variety of effects if present in sufficient concentrations. Additionally, many PFAS, including perfluorooctanoate (PFOA) and perfluorooctanesulfonate (PFOS) are both highly stable and can be mobile in the subsurface. These compounds typically will not degrade under ambient environmental conditions, including those found in surface water and groundwater aquifers. Due to this persistence, if water that is contaminated with PFAS is to be used as a source of drinking water, the PFAS must first be removed to levels that are acceptable to protect human health.

Several factors make PFAS difficult to remove from water. First, PFAS are highly stable and soluble in water, which makes many conventional treatment technologies including biodegradation, many advanced oxidation processes, and thermal treatment largely ineffective. Second, because PFAS come in a large variety of types with varying physical and chemical properties (e.g., electrostatic charge, hydrophobicity, etc.), no single water treatment technology has yet been identified that can address the entire spectrum of PFAS. For example, long-chain PFAS are typically well removed by adsorption processes, while short-chain PFAS are not (Gagliano, E., Sgroi, M., Falciglia, P. P., Vagliasindi, F. G. A., Roccaro, O., Removal of poly- and prefluoroalkyl substances (PFAS) from water by absorption; Role of PFAS chain length, effect of organic matter and challenges in absorbent regeneration, Water Research (2020), https://doi.org/10.1016/j.watres.2019.115381). Third, based on the current understanding of PFAS toxicology, the U.S. Environmental Protection Agency (USEPA) has issued a Draft Interim Recommendation for the preliminary remediation goal for PFOA+PFOS combined to be equal to the currently accepted Health Advisory level of 70 nanograms per liter (ng/L) (USEPA, 2019). This is nearly two orders of magnitude more stringent than cleanup standards for other common groundwater contaminants such as benzene or trichloroethene (5,000 ng/L).

Currently available groundwater remediation technologies that are used to destroy other contaminants such as petroleum hydrocarbons or chlorinated solvents are not effective for treating PFAS in groundwater plumes or source zones. Bioremediation which is capable of destroying or detoxifying many conventional contaminants has not been demonstrated to successfully destroy PFAS outside of limited and controlled laboratory conditions (Shan Huang and Peter R. Jaffe, Defluorination of Perfluorooctanoic Acid (PFOA) and Perfluorooctane Sulonate (PFOS) by Acidimicrobium, *Environmental Science & Technology*, 2019, 53 (19), 11410-11419, https://doi.org/10.1021/acs.est.9b04047). While thermal treatment shows some potential for addressing PFAS contamination in the vadose zone, it is not capable of destroying PFAS in groundwater due to their limited volatility and high temperatures (higher than the boiling point of water) required (Crownover E, Oberle D, Kluger M, Heron G., Perfluoroalkyl and polyfluoroalkyl substances thermal desorption evaluation, *Remediation*, 2019; 29:77-81, https://doi.org/10.1002/rem.21623). The application of advanced oxidation for the treatment of PFAS contamination has been met with limited success and there has been no clear consensus on the level of degradation that can be achieved or full characterization of end products (Erika F. Houtz and David L. Sedlak, Oxidative Conversion as a Means of Detecting Precursors to Perfluoroalkyl Acids in Urban Runoff, *Environmental Science & Technologies*, 2012, 46, 17, 9342-9349, https://doi.org/10.1021/es302274g; Erica R. McKenzie, Robert L. Siegrit, John E. McCray, and Christopher P. Higgins, Effect of Chemical Oxidants on Perfluoroalkyl Acid Transport in On-Dimentional Porous Media Columns, *Environmental Science & Technologies*, 2015, 49, 3, 1681-1689, https://doi.org/10.1021/es503676p). See also Carey, G. R., Mcgregor, R., Pham, A. L., Sleep, B., Hakimabadi, S. G., Evaluating the longevity of a PFAS in situ colloidal activated carbon remedy, *Remediation*, 2019, 29(2), 17-31, US. https://doi.org/10.1002/rem.21593. PFAS have many unique and varied properties that require innovation in the form of new remediation technologies or combinations of existing remediation technologies to prevent these compounds from impacting human and environmental health.

The current lack of effective remediation technologies necessitates the use of pump and treat systems for the management of, often large and dilute, PFAS groundwater plumes. This strategy requires large volumes of water that must be extracted for separation or destruction in above-ground water treatment plants. As discussed in Kulkarni, P. R., Aranzales, D., Javed, H., Holsen, T., Johnson, N. W., Richardson S. D., Mededovic Thagard, S., Newell, C. J., 2022, Process to Separate Per- and Polyfluoroalkyl Substances (PFAS) from Water Using Colloidal Gas Aphrons (CGAs), Remediation Journal, accepted, 2022, foam fractionation presents an above-ground alternative with a separation/concentration step that would reduce the volume of PFAS-containing water. The concentrated PFAS-containing foam can then be disposed, incinerated, or treated. Recent studies applying foam fractionation, in which air or nitrogen gas is bubbled through a separation column containing PFAS-impacted water, have yielded promising results. Here, PFAS is removed from the bulk solution by accumulating on the gas-liquid interfaces of the air bubbles and the foam layer can be removed and collapsed to form a high-concentration, low-volume solution (J. Merz, G. Schembecker, Stephanie Riemer, M. Nimtz, H. Zorn, Purification and identification of a novel cutinase from Coprinopsis cinerea by adsorptive bubble separation, *Separation and Purification Technology*, 69:1, 2009, 57-62, 1383-5866, https://doi.org/10.1016/j.seppur.2009.06.021; J. Merz, B. Burghoff, H. Zorn, G. Schembecker, Continuous foam fractionation: Performance as a function of operating variables, *Separation and Purification Technology*, 82, 2011, 10-18, 1383-5866, https://doi.org/10.1016/j.seppur.2011.07.023; Burns, D. J., Stevenson, P., & Murphy, P. J. C0, PFAS removal from groundwaters using Surface-Active Foam Fractionation, *Remediation*, 2021, 1-15, https://doi.org/10.1002/rem.21694). Foam fractionation has been tested with impacted groundwater (Burns et al., 2021), as well as landfill leachate (McCleaf, P., Kjellgren, Y., & Ahrens, L., Foam fractionation removal of multiple per- and polyfluoroalkyl substances from landfill leachate, *AWWA Water Science*, 2021, e1238, http://doi.org/10.1002/aws2.1238), and provides high removal efficiency (>90%) for long-chain PFAS but has significantly lower effectiveness for short-chain PFAS (~20-70%) and precursors (11-90%) for the same treatment times (McCleaf et al., 2021) (Kulkarni et al., 2022). Overall, CGAs can be used to improve existing foam fractionation processes by capturing the more challenging PFAS compounds (short-chain PFAS and precursors) that are difficult to remove from water. As such, the preferred embodiments of the invention present a method for concentrating and reducing the amount of extracted groundwater that needs to be treated. Additionally, the preferred embodiments of the invention can be used in-situ as an improvement to in-well existing foam fractionation processes or improve emerging gas sparging technologies.

SUMMARY OF THE INVENTION

A process is disclosed for the ex-situ or in-situ concentration of PFAS in water to facilitate the removal of PFAS from water, either ex-situ (at the surface) or in-situ (in the subsurface). The process relies on the use of colloidal gas aphrons (CGAs), which are an unusual mixture of air, surfactant, and water. CGAs have powerful sorbent properties and are used for separation via electrostatic and hydrophobic partitioning processes. CGAs have been tested with dyes, in the food industry, heavy metals, and with contaminants such as trichloroethylene (TCE) with a high performance levels (95-98% removal) (S. Basu & P. R. Malpani, Removal of Methyl Orange and Methylene Blue Dye from Water using Colloidal Gas Aphron-Effect of Processes Parameters, *Separation Science and Technology*, 36:13, 2997-3013, https://dx.doi.org/10.1081/SS-100107642; Hashim, M. A., Mukhopadhyay, S., Gupta, B. S. and Sahu, J. N., Application of Colloidal Gas aphrons for pollution remediation, *J. Chem. Technol. Biotechol.*, 2007, 87: 305-324, https://doi.org/10.1002/jctb.3691; Wei Tao, Changgen Mei, Nurhidayah Hamzah, The application of surfactant colloidal gas aphrons to remediate contaminated soil: A review, *Journal of Contaminant Hydrology*, 2020, 231, 103630, 0169-7722, https://doi.org/10.1016/j.jconhyd.2020.103620). As compared to air bubbles, they are fundamentally a different structure, significantly smaller, with diameters of approx. 10-100 μm (E. Fuda, P. Jaruegi, An insight into the mechanism of protein separation by colloidal gas aphrons (CGA) generated from ionic surfactants, *Journal of Chromatography B*, 2006, 843:2, 317-326, 1570-0232, https://doi.org/10.1016/j.jchromb.2006.06.032; Aysan Molaei, Kristian E. Waters, Copper ion removal from dilute solutions using colloidal liquid aphrons, *Separation and Purification Technology*, 2015, 152, 115-122, https://doi.org/10.1016/j.seppur.2015.08.001) as compared to typical air bubble diameters (e.g., diffuser plate pore sizes) of 100-50,000 μm (SSI, 2019; Hiblow, 2021). They are also more stable, and more easily separated in treatment processes. The small diameter of CGAs can provide ~100× greater contact area (assuming aphron diameter of 100 μm and air bubble diameter of 10,000 μm) and longer working time than the small air bubbles that are typically used to remove PFAS during foam fractionation (Kulkarni et al., 2022). Additionally, they have been tested with the injection of drilling fluids for hydrocarbon removal (Pasdar, M., Kazemzadeh, E., Kamari, E. et al. (2020), Insight into selection of appropriate formulation for colloidal gas aphron (CGA)-based drilling fluids, *Pet. Sci.* 17, 759-767, https://doi.org/10.1007/s12182-020-00435-z). However, to our knowledge, CGAs have not been considered to treat complex mixtures of contaminants with a variety of electrostatic and hydrophobic properties such as what is commonly encountered with PFAS treatment in contaminated water.

Unlike gas bubbles, CGAs can be created with either anionic or cationic surfactants, allowing for capture of PFAS with different electrical charges such as cations, anions, and zwitterions at the same time. As such, mixed CGAs with different electrostatic surface charges can remove a wide variety of PFAS in waste streams, which is an important advantage since most PFAS waste streams are comprised of hundreds or thousands of different PFAS with widely different chemical properties.

CGAs are created by mixing an anionic or cationic surfactant (typically at concentrations above its critical micelle concentration) using a mixer at high speeds (>8,000 rpm). With the use of baffles in the mixing tank, the high shear forces create small-diameter CGAs composed of a gas interior, water middle layer, and a surfactant outer layer with an electrostatic charge on the surface.

For an ex-situ separation application of CGAs, water containing PFAS is directed through a separation column. CGAs are introduced into the bottom of the separation column causing PFAS dissolved in the water to sorb to the CGAs due to electrostatic and hydrophobic partitioning processes. The CGAs and the attached PFAS will then move upwards in the separation column because of the buoyancy of the CGAs. The CGAs accumulate on the top of the separation column and are then removed by pumping, skimming, or decanting. In a vessel that receives the removed CGAs, the CGAs will collapse on their own accord leaving a low volume, high concentration waste stream that can then be sent for destructive treatment (e.g., incineration or plasma treatment), disposal, or managed in some other way. The water stream leaving the separation vessel will have no detectable or much lower concentrations of PFAS that either require no further treatment or only a light polishing step to reduce PFAS concentrations to acceptable levels.

Reducing the volume of the PFAS waste stream has important implications for transportation and disposal costs. Smaller, high concentration waste volumes are much easier to transport than large volumes of low concentration wastewater. In addition, some destructive technologies are difficult to upscale to accommodate high flowrates or large volumes. As a result, low volume, high concentration waste streams are ideal for destructive technologies with lower treatment capacities.

In some cases, CGAs can be integrated directly into PFAS destructive technologies. For example, in a plasma based treatment technology (Nau-Hix, C., Multari, N., Singh, R. K., Richardson, S. D., Kulkarni, P. R., Anderson, R. H., Holsen, T. M., Mededovic Thagard, S., 2021, Field Demonstration of a Pilot-Scale Plasma Reactor for the Rapid Removal of Poly-and Perfluoroalkyl Substances in Groundwater, *Environmental Science and Technology (ES&T), Water*, 1 (3), 680-687) argon gas bubbles are currently used to separate PFAS from water within a plasma reactor and the bubbles rise to the surface of the water where they encounter an electrically generated plasma that can destroy PFAS. CGAs may be suitable for the same purpose within the plasma reactor, but provides a different mechanism for removing the PFAS from the water.

CGAs may also provide a more efficient approach to conventional ex-situ and in-situ foam fractionation processes, where a combination of air bubbles and CGAs are used together to treat PFAS-containing water.

For in-situ applications to treat contaminated groundwater, CGA injection can be conducted within and/or under the PFAS plume in the aquifer. When CGAs are introduced in a groundwater treatment zone, PFAS will collect on the outer surface via electrostatic and hydrophobic partitioning processes and be drawn upwards by the buoyancy of the injected CGAs. The injection of CGAs results in lower PFAS concentrations in the deeper portions of the i zone, remediating this portion of the aquifer. Further, CGA injection will create higher PFAS concentrations and, in some cases, a CGA-PFAS buoyant layer near the top of the aquifer, making it easier to remove the PFAS by pumping or skimming of low volumes of groundwater and/or by direct removal of the CGA-PFAS layer. Additionally, CGA injection can occur in-situ via injection in a permeable trench or wells (either vertical or horizontal).

The primary advantage of the invention is that CGAs can remove hydrophobic, charged, or hydrophobic and charged chemicals dissolved in water. All regulated PFAS are charged, hydrophobic chemicals.

Another advantage of CGAs is their small diameter and higher contact area for removing charged and/or hydrophobic chemicals compared to even small gas bubbles.

Additionally, CGAs have the advantage that they self-separate from a water body or water stream due the inherent buoyance of the CGAs.

Another advantage is that CGAs have a short lifespan, on the order of several minutes, before they collapse and convert to a liquid phase that can then be easily transported for further treatment or disposal.

In addition, CGAs with different charges on each individual aphron can be created, allowing for the treatment of PFAS waste streams that typically are a mixture comprised of cationic, anionic, and zwitterionic PFAS.

Another advantage of the invention is to provide a system for removal of PFAS from a groundwater aquifer via injection through vertical or horizontal wells and concentrate the PFAS at the top of the aquifer, thereby making it easier to remove the concentrated PFAS.

Yet another advantage of the invention is to provide a system for removal of PFAS in groundwater flowing through a permeable trench by concentrating the PFAS near the top of the saturated media in the trench for easier removal.

Yet another advantage of the invention is to provide a system for removal of PFAS through the injection of CGAs in a groundwater well, after which concentrated PFAS on CGAs on the higher elevations of the well can be collected.

Yet another advantage of the invention is to provide a system for removal of PFAS that can be used within an existing ex-situ or in-situ treatment technology configuration requiring the concentration of PFAS from bulk liquid.

Other objects and advantages of the present invention will become apparent from the following descriptions, taken in connection with the accompanying drawings, wherein, by way of illustration and example, an embodiment of the present invention is disclosed.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE INVENTION

Detailed descriptions of the preferred embodiment are provided herein. It is to be understood, however, that the present invention may be embodied in various forms. Therefore, specific details disclosed herein are not to be interpreted as limiting, but rather as a basis for later filed claims and as a representative basis for teaching one skilled in the art to employ the present invention in virtually any appropriately detailed system, structure or manner.

A proof-of-concept laboratory experiment was performed to visually and quantitatively evaluate the removal of a PFAS surrogate from an artificial contaminated water system. PFAS are a diverse class of chemicals, and their analysis is complicated, expensive and time consuming. Prior art such as Sörengård, M., Östblom, E., Köhler, S., Ahrens, L., 2020, Adsorption behavior of per- and polyfluoralkyl substances (PFASs) to 44 inorganic and organic sorbents and use of dyes as proxies for PFAS sorption, *Journal of Environmental Chemical Engineering* 8, 103744, https://doi.org/10.1016/j.jece.2020.103744 (2020) further described below and in FIG. 1, have previously demonstrated that dyes can be successfully used as proxies to assess PFAS sorption where methylene blue (MB) correlates well with adsorption of shorter chain PFAS (such as perfluorobutanoic acid) via predominantly electrostatic forces, and rose bengal (RB) correlates well with adsorption of longer chain PFAS (such as perfluorooctanesulfonate) via predominantly hydrophobic forces (Sörengård et al., 2020). Therefore, for proof-of-concept purposes MB and RB were used to assess the efficacy of CGAs in removing short-chain and long-chain PFAS. The key mechanisms of contaminant removal by CGAs are via both electrostatic and hydrophobic interactions, so optimal removal is achieved when the contaminant and the CGAs are oppositely charged, or hydrophobic. MB and RB are cationic and anionic, respectively. Consequently, CGAs were made using anionic (sodium dodecylbenzenesulfonate (NaDBS)) and cationic (cetrimonium bromide (CTAB)) surfactants for MB and RB experiments, respectively.

Figure 1:
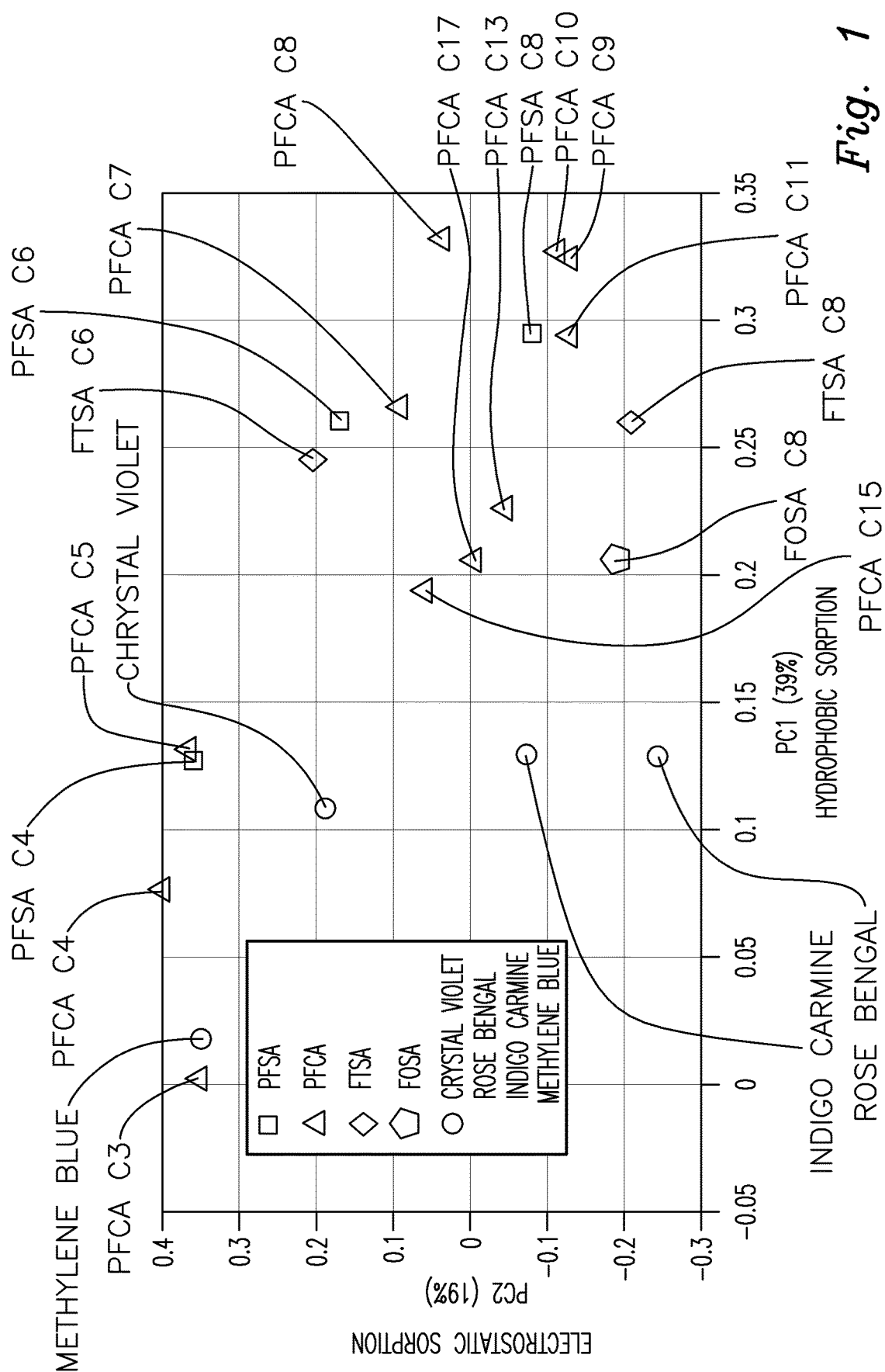
FIG. 1 provides an excerpt from the prior art in which dyes are demonstrated to be proxies for PFAS.

FIG. 1 illustrates the adsorption behavior of per- and polyfluoralkyl substances (PFASs) to 44 inorganic and organic sorbents and use of dyes as proxies for PFAS sorption with the x axis being hydrophobic sorption and the y axis being electrostatic sorption for a number of PFAS compounds, including PFSA, PFCA, FTSA, FOSA. Further depicted is methylene blue (MB) which correlates well with adsorption of shorter chain PFAS (such as perfluorobutanoic acid) via predominantly electrostatic forces, and rose bengal (RB) which correlates well with adsorption of longer chain PFAS (such as perfluorooctanesulfonate).

Figure 2:
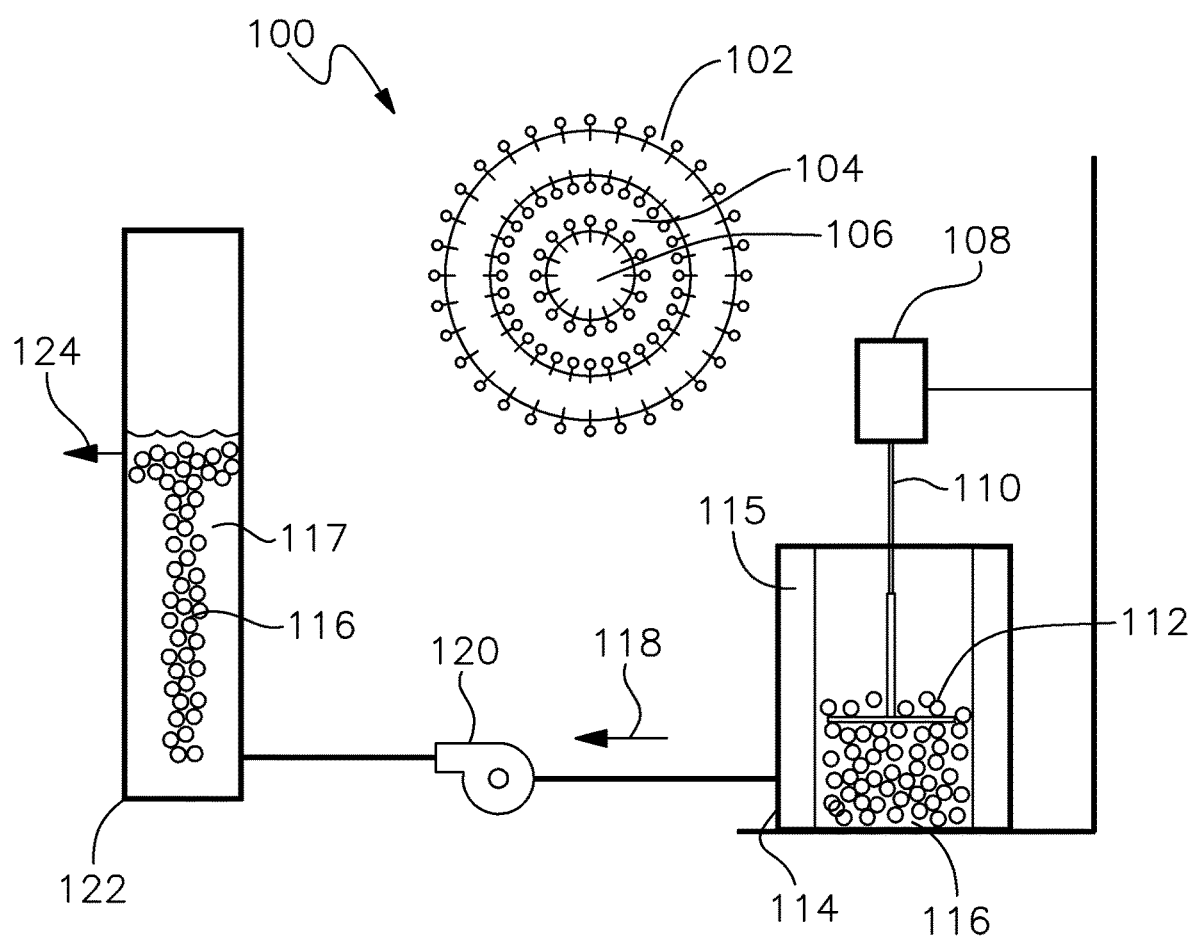
FIG. 2 illustrates an apparatus for proof-of-concept experiments where CGAs are generated using a spinning disc configuration and pumped through a column containing contaminated water.

In accordance with a preferred embodiment of the invention, the setup for experiments is shown in FIG. 2 and further described below. Bulk surfactant solution 100 in Beaker 114 is depicted schematically comprising CGAs made of a surfactant 102, liquid 104 and gas 106. The CGAs were generated using a spinning disc configuration having motor 108 connected via shaft 110 to disc 112. A rotary tool such as motor 108 is capable of approximately 5,000 to 35,000 revolutions per minute (rpm) and was connected to a 3D-printed shaft 110 with a 2.5-in. diameter disc 112 attached to the tool. Following the method of Longe (1989) and others, CGAs were produced in a 5-L beaker 114 which had four baffles 115 to enable adequate air induction and ensure that the entire fluid passed through the spinning disc zone where maximum shearing takes place. Beaker 114 was filled with 1-L surfactant solution 116 prepared above its critical micelle concentration (CMC). The concentration of CTAB and NaSDS solutions used in the experiments were 380 parts per million (ppm) (CMC~330 ppm) and 700 ppm (CMC~540 ppm), respectively. To produce CGAs, the spinning disc was lowered approximately 1-2 in. below the surface of the surfactant solution and the spinning disc was rotated at 12,500 rpm for 1 min to generate a cloudy fluid containing CGAs.

Peristaltic pump 120 transported the CGAs at a rate of 40 mL/min from beaker 114 in direction 118 to the bottom of a 2-L, 21-in. tall vertical separation column 122 containing 1.5-L of MB or RB dye solutions 117 (PFAS surrogate solutions). The MB and RB concentrations used were 20 ppm and 5 ppm, respectively. CGAs accumulating at the air/water interface were continuously removed in direction 124 from column 122.

The experiments were performed in batch mode. The CGAs were continuously removed from the batch separation column during the experiment. Surfactant solution 100 in Beaker 114 is depicted schematically comprising CGAs made of a surfactant 102, liquid 104 and gas 106.

Figure 3:
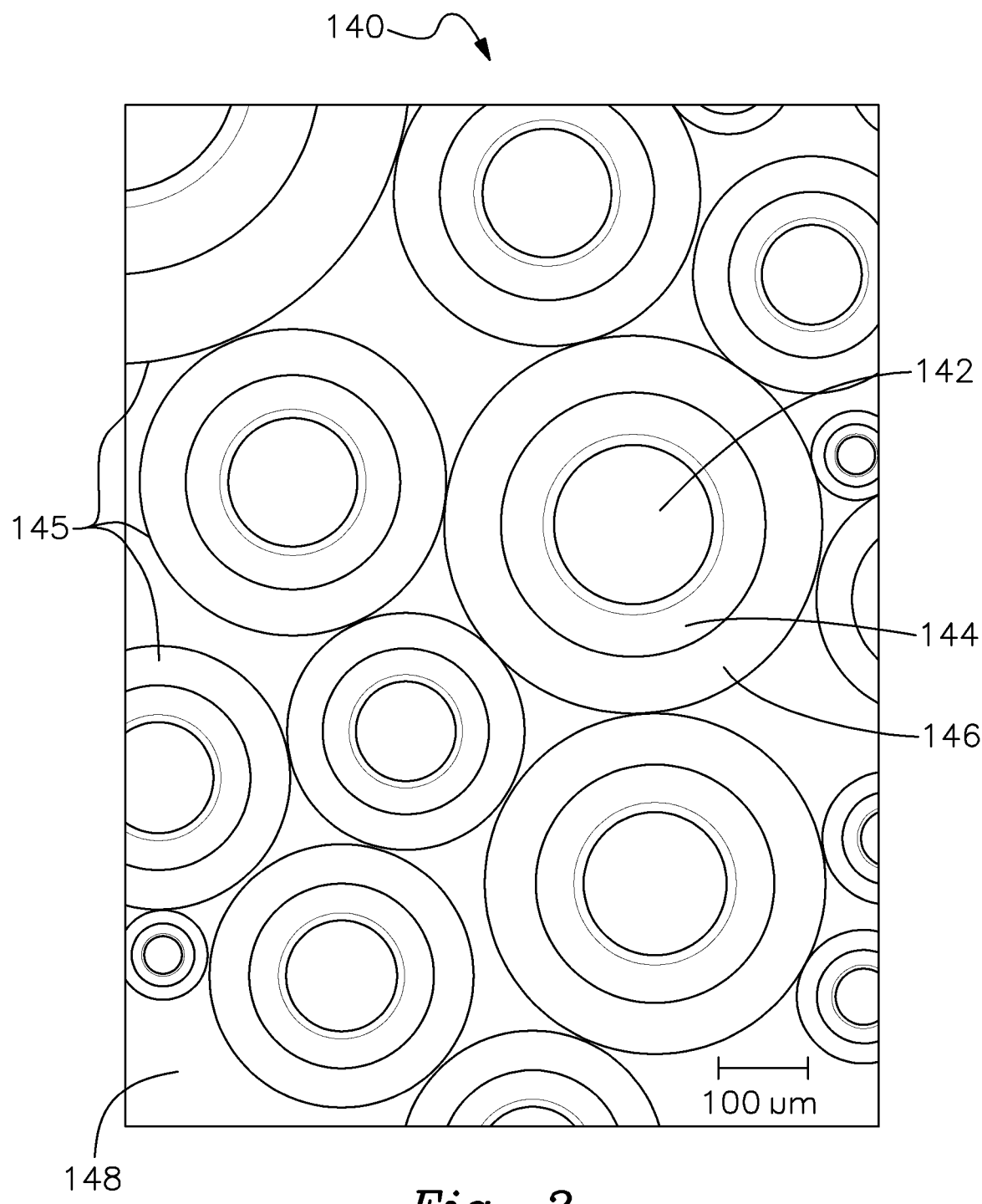
FIG. 3 illustrates the unique multi-layered structure of CGAs (air, water, and electrostatically-charged surfactant) formed during proof-of-concept experiments as observed via a microscope/camera assembly.

CGAs, with their unique multi-layered structure were successfully generated during the experiments which was confirmed using microscopy as shown diagrammatically in FIG. 3. Scan 140 shows a number of CGAs 145 in bulk water 148 with each CGA having air 142 in the center, surrounded by water layer 144, surrounded in turn with electrostatically charged surfactant layer 146 The CGAs were generated using a spinning disc configuration at 12,500 RPMs and imaged using light microscopy.

Dye concentrations were measured in the bulk liquid using a spectrophotometer. First, a calibration curve was created by creating known specific concentrations of dye and recording their resulting absorbance. For RB, wavelength was set at 550 nm, and for MB, wavelength was at 663 nm.

Dye solution was obtained from the separation column in the bulk liquid every minute and was filled in a cuvette for measurement. Resulting absorbances were recorded and dye concentrations were calculated using individual calibration curves.

Figure 4:
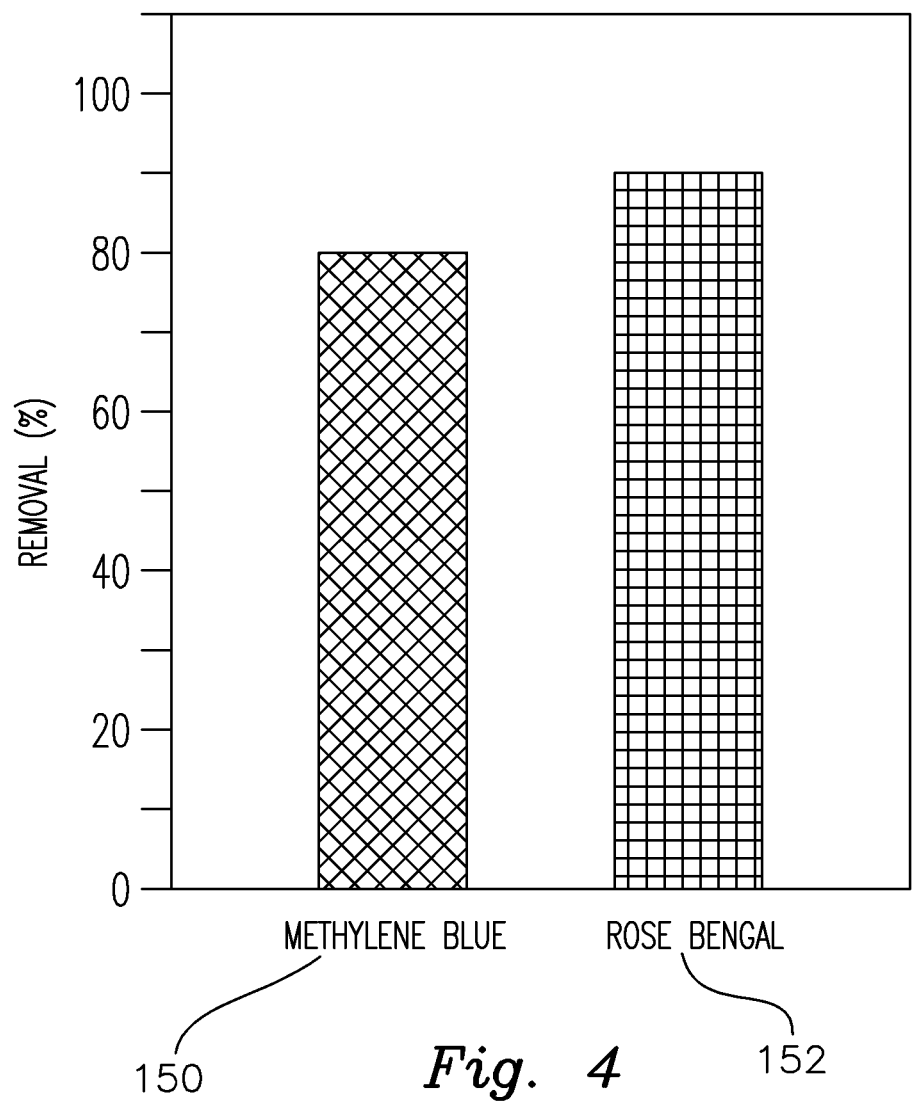
FIG. 4 illustrates the results of the experiments where CGAs were pumped through dye solutions.

FIG. 4 is a graph showing the results of dye removal that was observed during CGA sparging experiments. Removal in percentage is shown on the y axis for each of two solutions with methylene blue (MB) 150 shown in diagonal cross hatching and rose bengal (RB) 152 shown in rectangular cross hatching. CGS were introduced into 1.5 L dye solutions at a rate of 40 mL/minute. Overall, 81% MB and 91% RB removal in 6 to 8 minutes was observed, during CGA batch removal test as shown in FIG. 4, which demonstrates that CGAs can be used to remove both short- and long-chain PFAS, and anionic and cationic PFAS.

During some dye tests, the removal rates were initially high for the first several minutes, but then dropped as the test continued. This was later determined to be caused by leaving some of the CGAs at the top of the water layer in the separation column (e.g., the CGA removal step was inefficient during the test), and having these CGAs naturally collapse back to a liquid phase and thereby released the dye back into the water phase. This reduction in performance can be easily avoided in future laboratory tests or field applications by employing a more efficient CGA removal step.

A second set of experiments were conducted with liquid solutions containing analytical grade PFAS purchased from Sigma-Aldrich. PFAS were measured in the collected samples by targeted analysis using Liquid Chromatography with tandem mass spectrometry (LC-MS-MS).

Experiments were first conducted with liquid solutions containing ultra-short (triflate, TFA), short-chain (PFBA, PFBA), and long-chain (PFOA, PFOS) PFAS with a treatment time of 10 minutes using CGAs generated with CTAB (cationic surfactant).

Figure 5A:
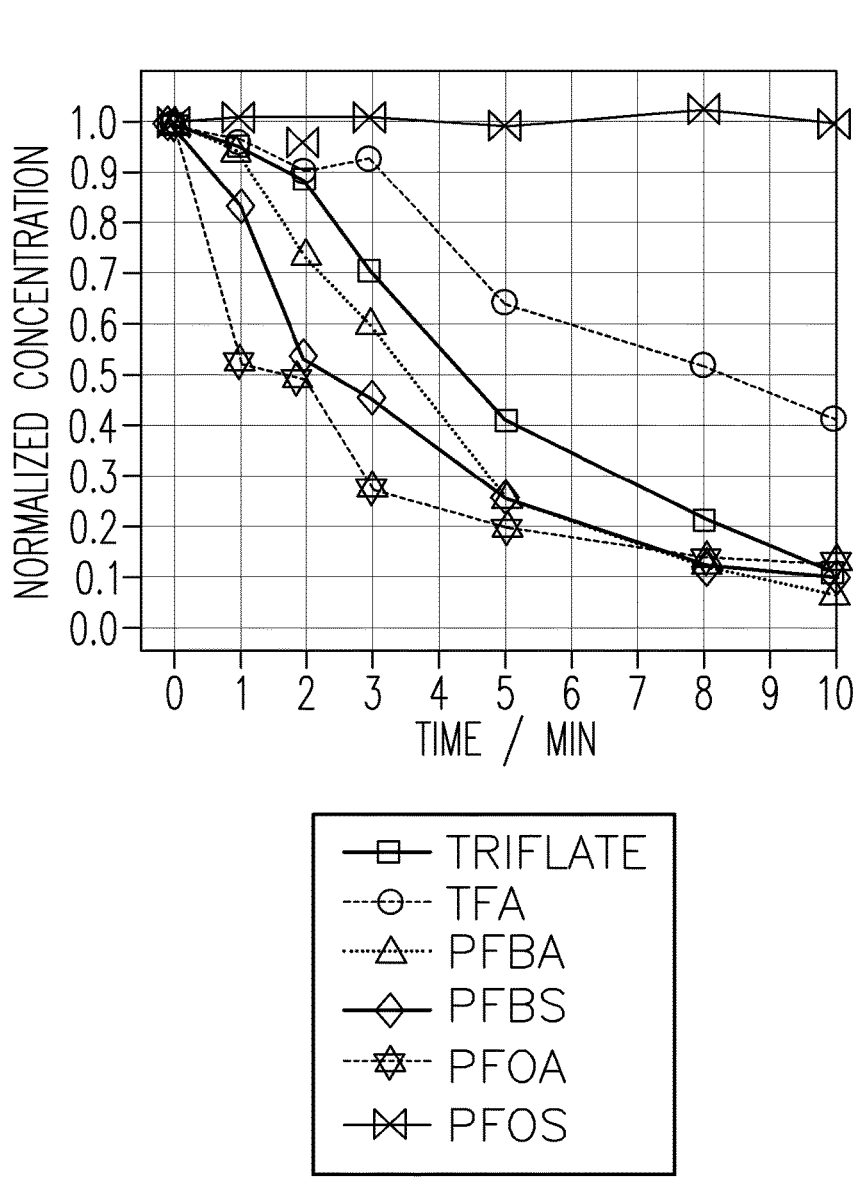
FIGS. 5A and 5B are graphs that show the results of experiments where CGAs were pumped through liquid solution containing six different PFAAs: trifluoromethanesulfonic acid (referred to as triflate in its deprotonated form), TFA, PFBA, PFBS, PFOA, and PFOS.
Figure 5B:
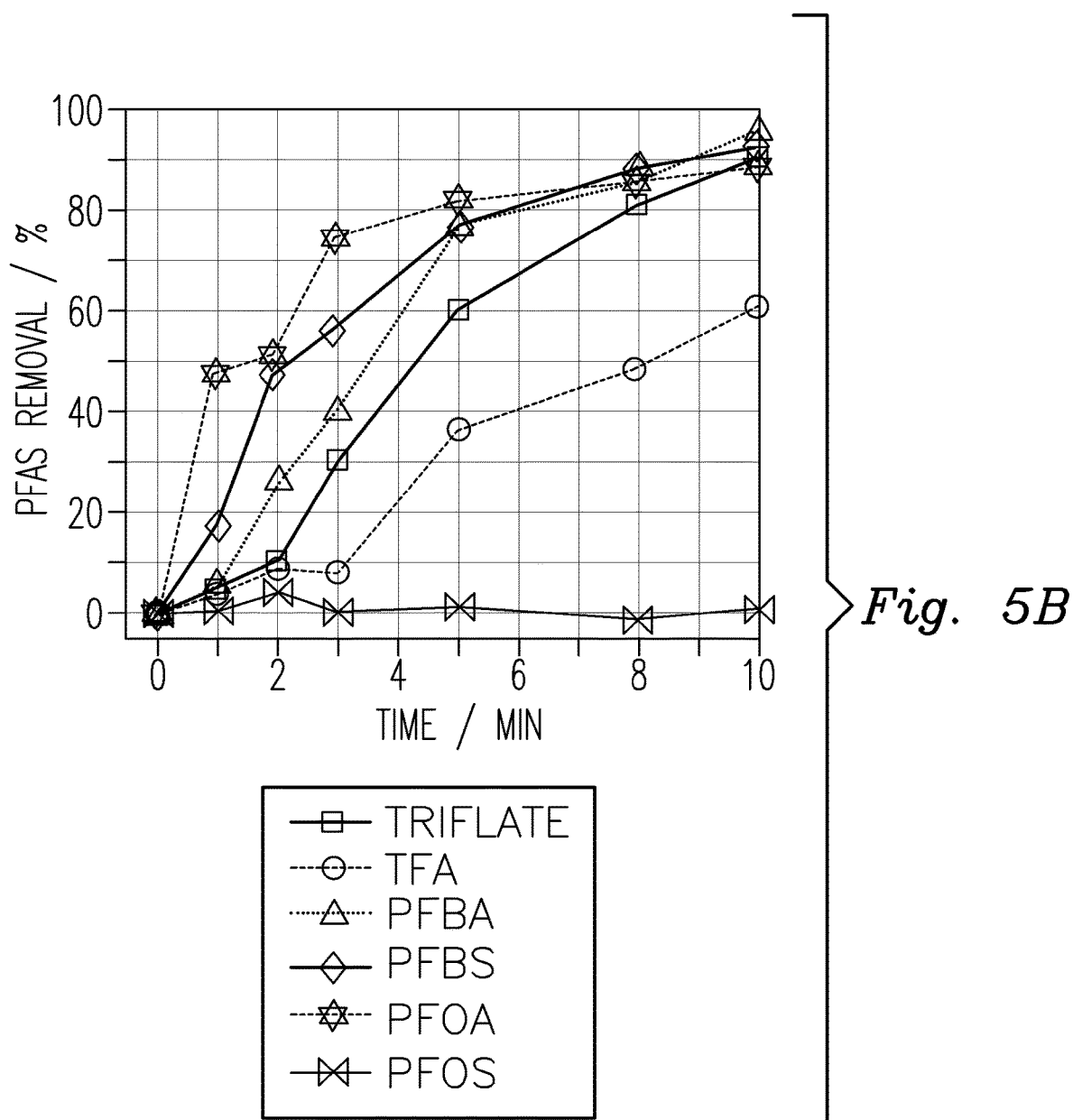

The percentage removals were as follows: 60-90% for ultra-short chain, 91-95% for short-chain, and 0-88% for long-chain PFAS. PFOA removal was 90% and no reduction in PFOS was observed (Kulkarni et al., 2022). FIG. 5A shows results of this experiment with the y axis being normalized concentration, and the x axis being time with data for triflate (TFA), short-chain (PFBA, PFBS), and long-chain (PFOA, PFOS) PFAS. FIG. 5B shows results of this experiment with the y axis being PFAS removal as a percentage and the x axis being time. The removal of ultra-short chain (triflate, TFA), short-chain (PFBA, PFBS), and long-chain (PFOA, PFOS) PFAS with a treatment time of 10 minutes using CGAs were as follows: 60-90% for ultra-short chain, 91-95% for short-chain, and 0-88% for long-chain PFAS. PFOA removal was 90% and no reduction in PFOS was observed Further control experiments were conducted comparing the removal of a short-chain PFAS (PFBA) by CGAs to the removal by gas bubbling alone ($N_2$) and gas bubbling (N2) in the presence of CTAB in the bulk solution.

Figure 6:
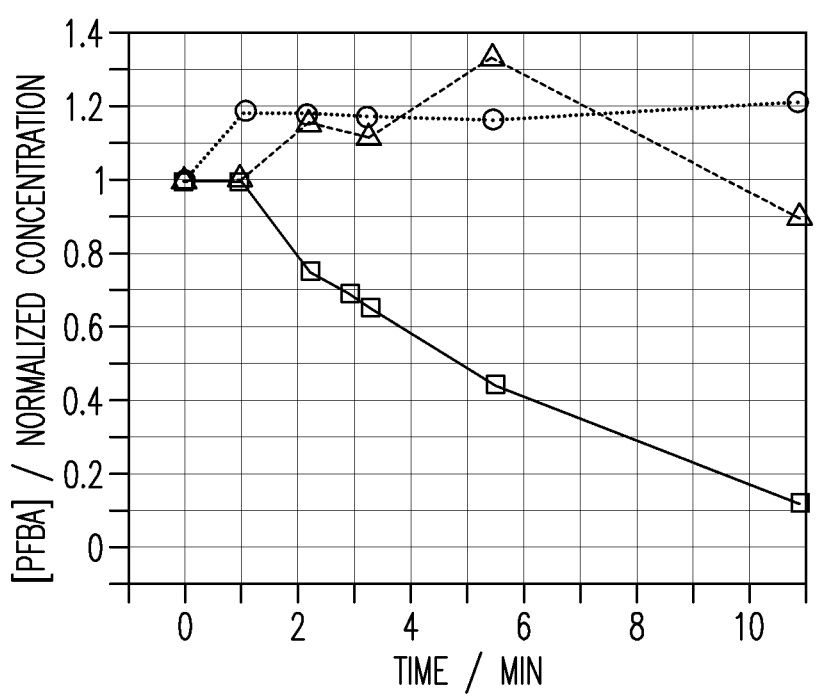
FIG. 6 illustrates control experiments comparing the removal of a short-chain PFAS (PFBA) by CGAs to the effect of removal by gas bubbling alone (N2) and gas bubbling (N2) in the presence of CTAB in the bulk solution.

As shown in FIG. 6, a graph is depicted with the x axis being time in minutes and the y axis being PFBA/Normalized Concentration. The graph shows results for CGAs, N2 Bubbles and NS Bubbles plus CTAB. As shown, removal via CGAs was significantly higher (90% for CGAs vs. 11% for nitrogen bubbling in a CTAB solution vs. 0% of nitrogen bubbling alone) with 10 minutes of treatment. Additionally, CGAs provided faster kinetics than nitrogen bubbling, with or without CTAB in bulk solution, for the removal of PFBA (short-chain PFAS) (Kulkarni et al., 2022).

Figure 7:
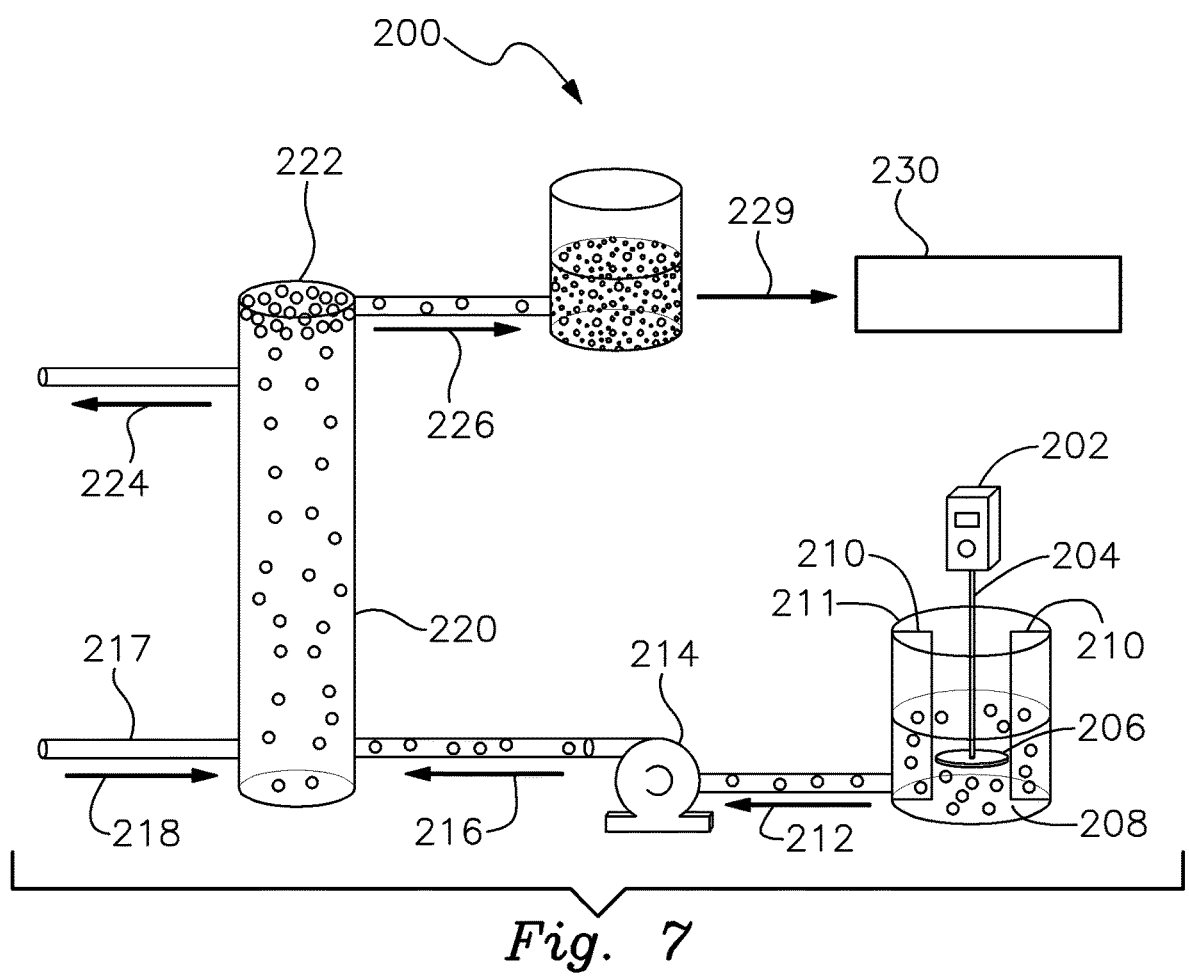
FIG. 7 illustrates the model of PFAS contaminated water being treated ex-situ using a separation column, and CGAs being pumped at the bottom of the column, with the CGA-high concentration PFAS layer then skimmed or pumped for further treatment or disposal.

In a preferred embodiment separation system 200 shown in FIG. 7, PFAS-containing water 217 is pumped in direction 218 into separation column 220 as influent water. Separately CGAs are generated and introduced into the bottom of separation column 220, containing PFAS impacted water, via direction 216 from pump 214 which in turn draws CGA solution 208 in direction 212 generated through spinning action of disc 206 being turned by shaft 204 connected to motor 202. Baffles 210 are position within beaker 211 to facilitate generation of CGAs.

PFAS sorb on the CGAs due to electrostatic and hydrophobic processes. The CGAs with the attached PFAS move upwards in separation column 220 because of the inherent buoyancy of the CGAs. Subsequently, a CGA layer 222 containing higher PFAS concentrations is created at the top of separation column 220 that is then removed from separation column 220 in direction 226 by pumping or skimming and into receiving vessel 228. Once in receiving vessel 228, the removed CGAs then collapse naturally in a few minutes (based on the scientific literature, the typical half-life before a a CGA collapses is ~4 minutes) to form a liquid with concentrated PFAS. This low-volume, high concentration liquid is delivered in direction 229 and treated by existing ex-situ treatment technologies 230 (e.g., destructive technologies), disposed safely in engineered depositories or landfills, or managed in some other way. Effluent water 224 is driven out of column 220.

Figure 8:
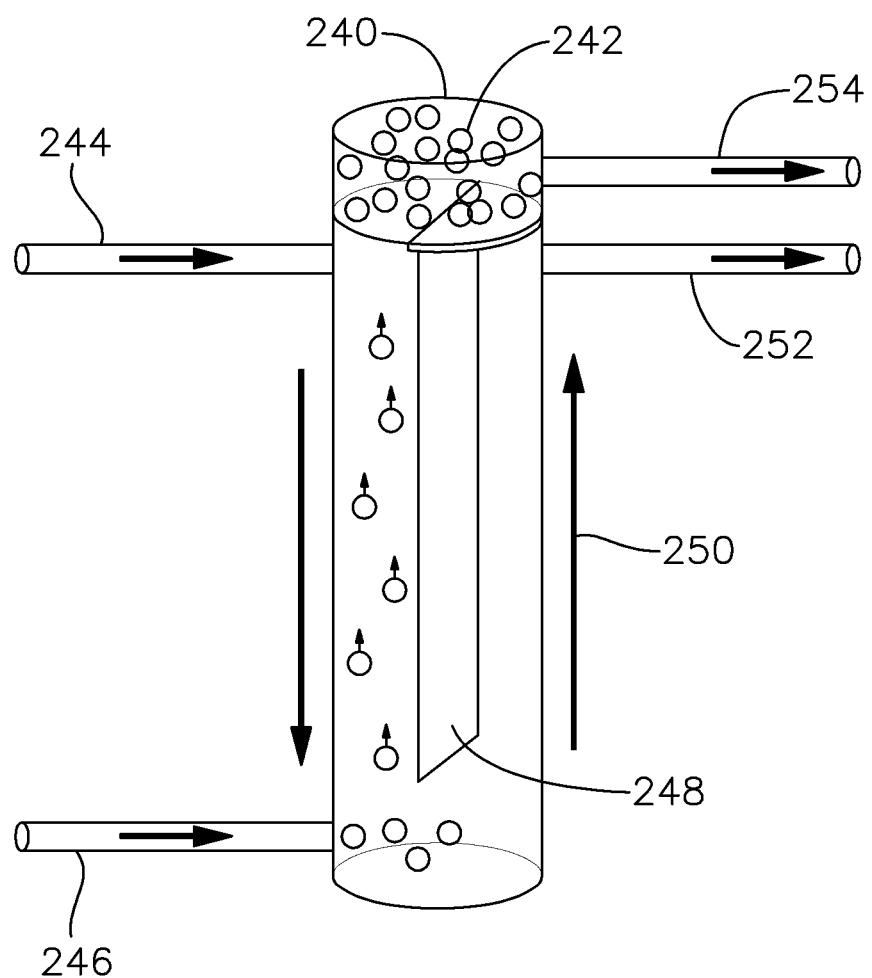
FIG. 8 shows a baffle in a separation column to increase contact time between CGAs and the influent stream according to a preferred embodiment of the invention.

FIG. 8 shows baffle 248 in separation column 240 according to a preferred embodiment of the invention. Baffle 248 can be added to separation column 240 to improve the separation and recovery of CGAs from effluent water by increasing the contact time between influent stream 244 and CGA mixture. CGAs are introduced into separation column 240 via input stream 246 with PFAS-contaminated water influent stream 244 being introduced in separation column 240. PFAS and CGAs collect in upper portion 242 of separator column 250 as they move in direction 250. Effluent water 252 flows off the top of separation column 240. CGAs are pumped out of separation column 240 via stream 254.

Figure 9:
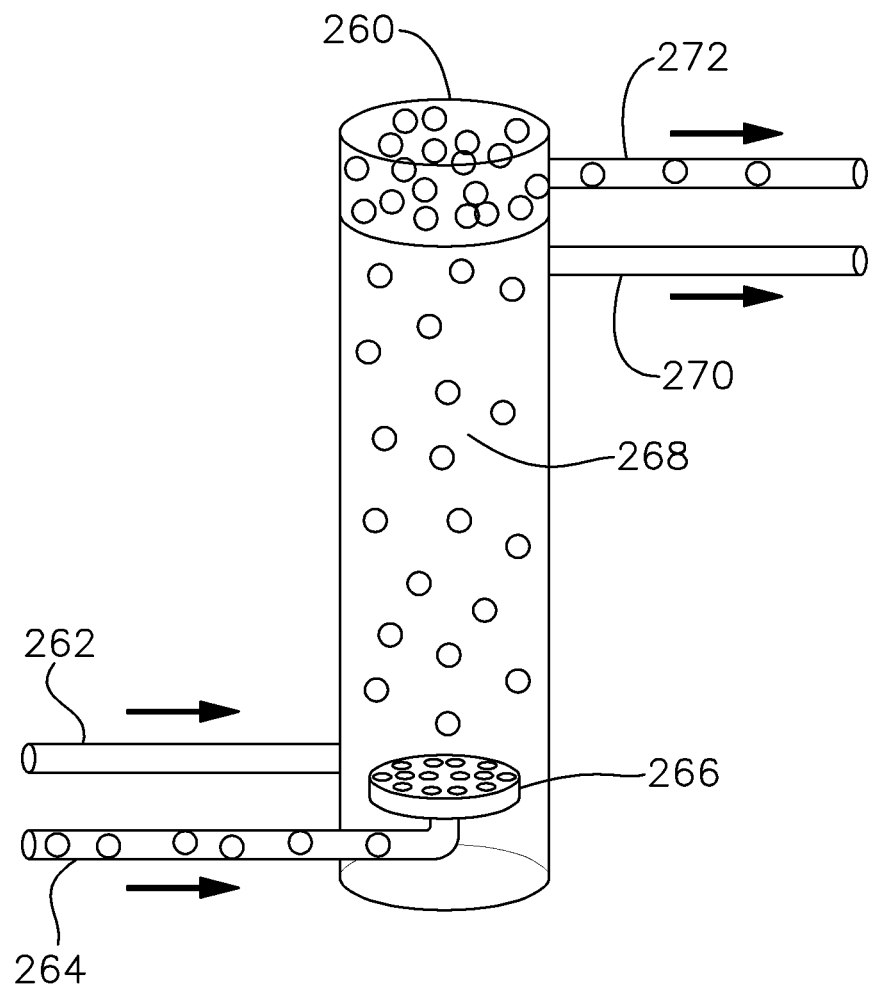
FIG. 9 shows the addition of a distribution plate for CGAs to enable more uniform delivery according to a preferred embodiment.

FIG. 9 shows the addition of perforated distribution plate 266 that can be added to separation column 260 with influent stream 262 and introduction of CGAs 268 through stream 264 through plate 266 through which the CGA mixture flows to enable more uniform delivery and distribution of CGAs according to a preferred embodiment. Effluent water flows through output 270 while collapsed CGAs and concentrated PFAS flow through output 272.

Figure 10:
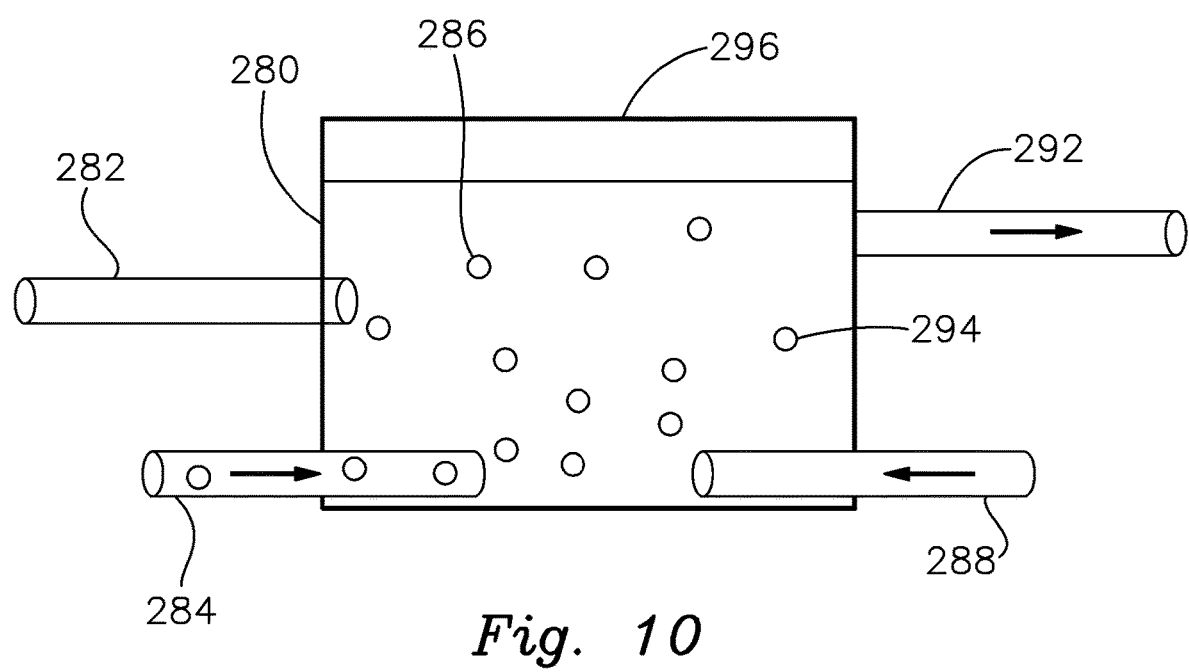
FIG. 10 shows a preferred embodiment where both gas bubbles and CGAs are used for either treatment or for separation.

FIG. 10 shows a system for separation in an existing gas/liquid PFAS treatment process. CGAs 286 are introduced via stream 284 into tank 280 with gas 294 being introduced via port 288. Influent water is introduced via stream 282 and CGAs can be used together with conventional gas bubbles for either direct treatment (such as a plasma reactor) or for separation (foam fractionation) 296. Effluent stream then flows out stream 292.

Figure 11:
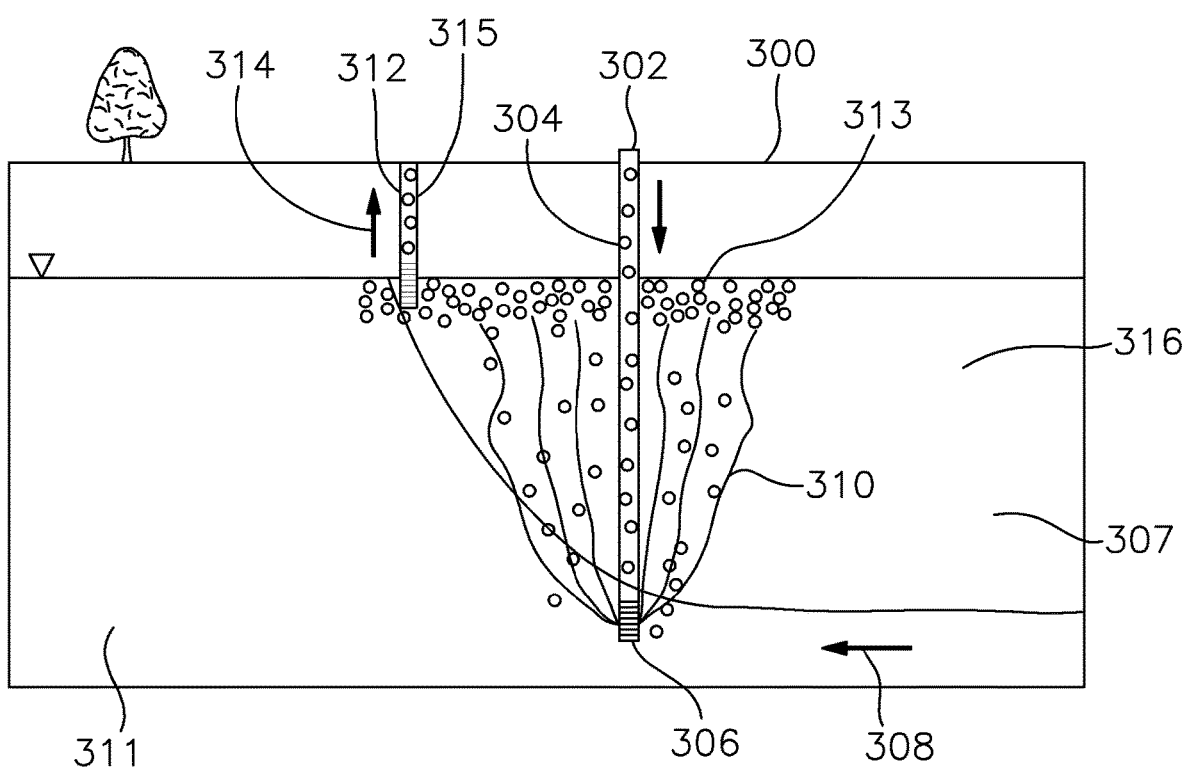
FIG. 11 illustrates a model of an in-situ application using another preferred embodiment, where CGAs are injected directly in the aquifer.

In an in-situ application shown in FIG. 11, CGAs 304 are injected via well 302 within and/or under PFAS plume 316 directly in aquifer 311 lying below ground 300. In this application well 302 is drilled in the formation 307 (either vertical or horizontal) and CGAs 304 are directed down well 302 and out well screen 306 near the bottom of well 302. When a CGA is introduced in a groundwater treatment zone 310, PFAS will collect at the outer surface via electrostatic and hydrophobic partitioning processes and be drawn upwards by the buoyancy of the injected CGA. The CGA injection results in lower PFAS concentrations in the deeper portions of the injection zone, remediating this portion of aquifer 311. The CGA-injection will also create higher PFAS concentrations 313 near the top of aquifer 311, making it easier to remove the PFAS by skimming the low volume of groundwater containing higher concentrations of PFAS and/or by direct removal of the CGAs using shallow extraction wells. Concentrated CGAs/PFAS 312 move in direction 314 through shallow well 315 where they can be skimmed for further treatment or disposal.

Figure 12:
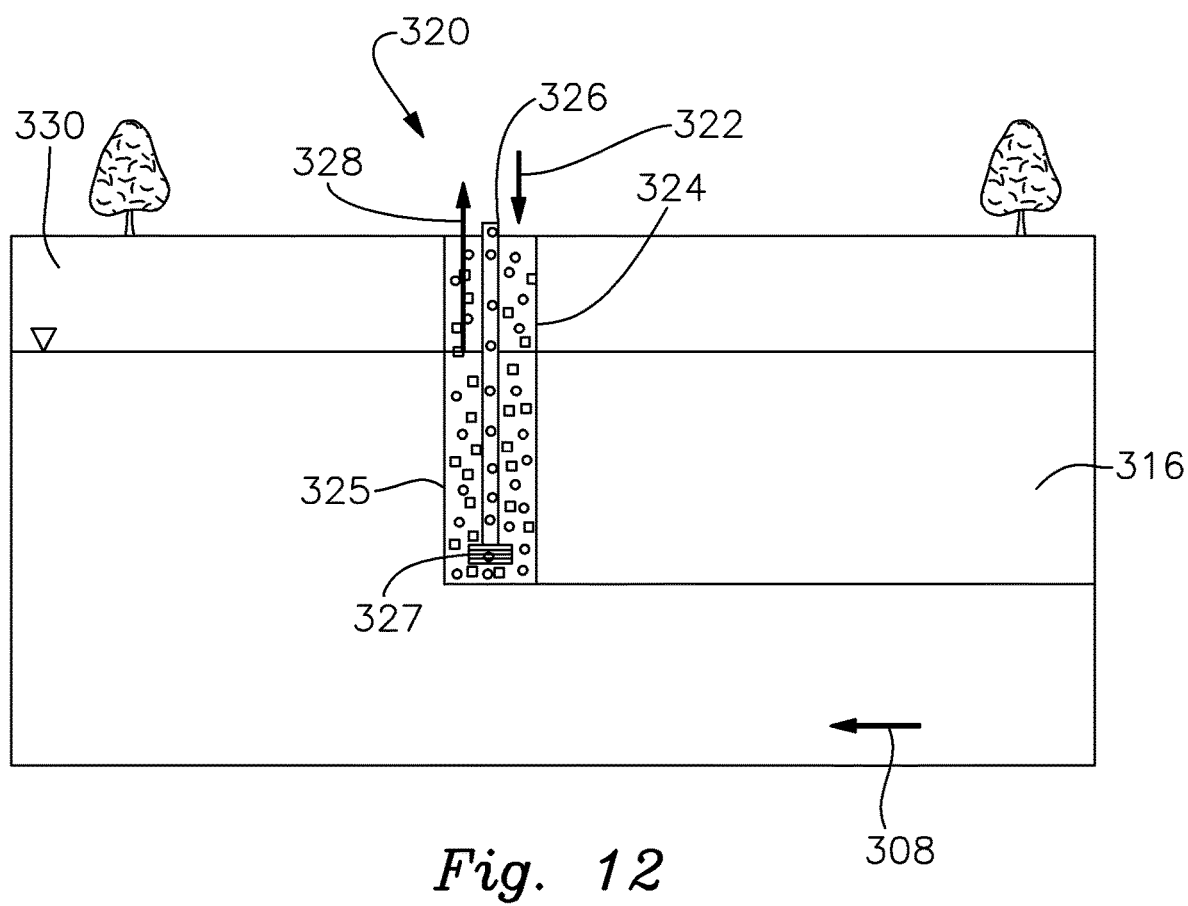
FIG. 12 illustrates the conceptual model of an in-situ application using yet another preferred embodiment, where CGAs are injected in man-made trenches.

In yet another embodiment shown in FIG. 12, in situ trench removal 320 utilizes CGA injection 322 that can be conducted through porous media 324 in man-made trenches 325 using gravel or sand or other materials drilled through ground 330 into aquifer 316. Under its natural horizontal flow gradient in direction 308, groundwater will flow through one side of trench 325 and out the opposite side. Injection of CGAs via well 326 in trench 325 through screen 327 serves to concentrate PFAS at the surface of the water via direction 328 to the surface, thereby facilitating the removal or treatment of the high concentration, lower volume of contaminated groundwater or CGA-PFAS layer.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the later issued claims.

The invention claimed is:

1. A method for the decontamination of water containing one or more PFAS, comprising the steps of:
   generating colloidal gas aphrons (CGAs) by mixing under high shear forces gas, water, and one or more surfactants together;
   introducing the CGAs and a PFAS-containing water in an enclosed space where the CGAs move upwards through the water due to their inherent buoyancy;
   sorbing the PFAS to the CGAs to extract PFAS from the water; and
   separating the PFAS-containing CGAs from the surface of the water in the enclosed space for further treatment or disposal, leaving the water with lower PFAS concentrations in a vessel.

2. The method as claimed in claim 1 where a surfactant or surfactants with the same charge (either anionic or cationic) are used.

3. The method as claimed in claim 1 where at least two surfactants with different charges (anionic and cationic) are used.

4. The method as claimed in claim 1 where the properties of the CGAs are adjusted by at least one of the following: shear forces; mixing speed; or surfactant concentration.

5. The method as claimed in claim 1 where gas bubbles and CGAs are introduced into the PFAS-containing water to remove contaminants.

6. The method as claimed in claim 1 where the step of separating the PFAS-containing CGAs from the surface of the water is conducted in a batch system.

7. The method as claimed in claim 1 further comprising adding the water to a plasma reactor to destroy PFAS.

8. The method as claimed in claim 1 further comprising using gas bubbles to remove PFAS from water.

9. The method as claimed in claim 1 where the water contains one PFAS.

10. The method as claimed in claim 1 where one or more of the PFAS are anionic.

11. The method as claimed in claim 1 where one or more of the PFAS are cationic.

12. The method as claimed in claim 1 where one or more of the PFAS are zwitterionic.

13. The method as claimed in claim 1 where one or more of the PFAS are long-chained.

14. The method as claimed in claim 1 where one or more of the PFAS are short-chained.

15. The method as claimed in claim 1 where one or more of the PFAS are perfluoroalkyl acids.

16. The method as claimed in claim 1 where one or more of the PFAS are polyfluoroalkyl substances that degrade to create perfluoroalkyl acids (PFAAs).

17. The method as claimed in claim 1 where the plurality of CGAs extract PFAS from the water due to both electrostatic and hydrophobic processes.

18. The method as claimed in claim 1 where the CGAs are pumped from the enclosed space.

19. The method as claimed in claim 1 where the CGAs are decanted from the enclosed space.

20. The method as claimed in claim 1 where the CGAs are allowed to revert naturally to liquid form prior to transportation to treatment or disposal.

21. The method as claimed in claim 1 where the CGAs are facilitated to revert to liquid form prior to transportation to treatment or disposal.

22. The method as claimed in claim 1 where baffles are placed in the enclosed space to change the flow direction in the vessel to facilitate the separation of the aphrons from the vessel.

23. A method for the decontamination of water containing one or more PFAS contaminants, comprising the steps of:
generating colloidal gas aphrons (CGAs) using a gas, water, and electrostatically charged surfactant mixed under high shear forces where the water contains PFAS;
introducing the CGAS into water containing one or more PFAS contaminants;
sorbing the PFAS to the CGAs by the action of electrostatic and hydrophobic partitioning to remove PFAS from the water; and
disposing of the PFAS-containing CGAs.

24. The method as claimed in claim 23 further comprising the step of using a plasma reactor to treat CGAs.

25. The method for the decontamination of an aquifer containing one or more PFAS contaminants, comprising the steps of:
generating colloidal gas aphrons (CGAs) by mixing a gas, water, and at least one surfactant with high shear forces;
injecting the CGAs through an open tube into a geologic formation through a natural aquifer material, the one or more PFAS contaminants accumulating on the plurality of CGAs; and
generating a layer of CGAs and accumulated PFAS on a top surface of a water table in the geologic formation.

26. The method as claimed in claim 25 wherein the aquifer material is comprised of one or more of the following: gravel, sand, silt, clay, or fractured geologic media, or some combination thereof.

27. The method as claimed in claim 25 further comprising the step of extracting the accumulated PFAS and CGAs.

28. The method of claim 25 further comprising the step of allowing the accumulated PFAS to be retained in a subsurface of the geologic formation.

29. A method for the decontamination of water containing one or more PFAS, comprising the steps of:
generating colloidal gas aphrons (CGAs) by mixing under high shear forces gas, water, and one or more surfactants together;
introducing the CGAs and a PFAS-containing water in a continuous reactor where the CGAs move upwards through the water due to their inherent buoyancy;
sorbing the PFAS to the CGAs to extract PFAS from the water; and
separating the PFAS-containing CGAs from the surface of the water in an enclosed space for further treatment or disposal, leaving the water with lower PFAS concentrations in a vessel.

* * * * *